US009521669B2

(12) United States Patent
Wang et al.

(10) Patent No.: US 9,521,669 B2
(45) Date of Patent: Dec. 13, 2016

(54) HARQ FOR DYNAMIC CHANGE OF THE TDD UL/DL CONFIGURATION IN LTE TDD SYSTEMS

(75) Inventors: Yiping Wang, Allen, TX (US); Jun Li, Richardson, TX (US); Yi Song, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 561 days.

(21) Appl. No.: 13/448,212

(22) Filed: Apr. 16, 2012

(65) Prior Publication Data

US 2013/0272169 A1      Oct. 17, 2013

(51) Int. Cl.
*H04W 72/04*    (2009.01)
*H04L 5/14*     (2006.01)
*H04L 5/00*     (2006.01)
*H04B 7/26*     (2006.01)
*H04L 1/18*     (2006.01)

(52) U.S. Cl.
CPC ....... *H04W 72/0446* (2013.01); *H04B 7/2656* (2013.01); *H04L 1/1822* (2013.01); *H04L 1/1861* (2013.01); *H04L 5/0055* (2013.01); *H04L 5/143* (2013.01)

(58) Field of Classification Search
USPC ......................................................... 370/280
See application file for complete search history.

(56) References Cited

U.S. PATENT DOCUMENTS

| 2008/0080476 | A1* | 4/2008 | Cho et al. ................ 370/350 |
| 2011/0035639 | A1* | 2/2011 | Earnshaw et al. ........ 714/748 |
| 2011/0211503 | A1* | 9/2011 | Che et al. ................ 370/280 |
| 2013/0194980 | A1* | 8/2013 | Yin et al. ................ 370/280 |
| 2014/0010213 | A1* | 1/2014 | Wang ................ H04B 7/0486 370/336 |

FOREIGN PATENT DOCUMENTS

WO     2010/129295     11/2010

OTHER PUBLICATIONS

3GPP TS 36.211 V10.4.0 (Dec. 2011): "3rd Generation Partnership Project; Thechnical Specification Group Radio Access Network; Evolved Universal Terrestrial Radio Access (E-UTRA); Physical Channels and Modulation (Release 10)"; 101 pages.

(Continued)

*Primary Examiner* — Michael Thier
*Assistant Examiner* — Brian Cox
(74) *Attorney, Agent, or Firm* — Fish & Richardson P.C.

(57) ABSTRACT

Systems, methods, and apparatuses are directed to reconfiguring a time division duplex (TDD) uplink/downlink (UL/DL) configuration. A first TDD UL/DL configuration can be identified for a first radio frame. A second TDD UL/DL configuration can be identified for a second radio frame adjacent the first radio frame. The second TDD UL/DL configuration can be identified based, at least in part, on one or more subframes of the second TDD UL/DL configuration that can communicate hybrid automatic repeat request (HARQ) acknowledgement/negative acknowledgement (ACK/NACK) indicators for corresponding subframes of the first TDD UL/DL configuration.

8 Claims, 11 Drawing Sheets

(56) References Cited

OTHER PUBLICATIONS

3GPP TS 36.213 V10.4.0 (Dec. 2011): "3rd Gerneration Partnership Project; Technical Specification Group Radio Access Network; Evolved Universal Terrestrial Radio Access (E-UTRA); Physical Layer Procedures (Release 10)"; 125 pages.
Ericsson, ST-Ericsson; "New Study Item Proposal for Further Enhancements to LTE TDD for DL-UL Interference Management and Traffic Adaptation"; 3GPP TSG-RAN Meeting #50 (RP-101427); Istanbul, Turkey; Dec. 7-10, 2010; 5 pages.
Ericsson, ST-Ericsson; "New Study Item Proposal for UL-DL Flexibility and Interference Management in LTE TDD"; 3GPP TSG-RAN Meeting #50 (RP-101265); Istanbul, Turkey; Dec. 7-10, 2010; 5 pages.
Ericsson, ST-Ericsson; "New Study Item Proposal for Further Enhancements to LTE TDD for DL-UL Interference Management and Traffic Adaptation"; 3GPP TSG-RAN Meeting #51 (RP-110440); Kansas City; Mar. 15-18, 2010; 6 pages.
"Draft Report of 3GPP TSG RAN WG1 #68 v0.1.0, Dresden, Germany, Feb. 6-10, 2012"; 3GPP TSG RAN WG1 Meeting #68bis; Jeju, South Korea; Mar. 26-30, 2012; 92 pages.
Extended European Search Report issued in European Application No. 12185266.9 on Feb. 6, 2013; 8 pages.
Alcatel-Lucent Shanghai Bell, Alcatel-Lucent; "Discussion on HARQ and UL-Grant Timing with Dynamic TDD UL-DL Configuration"; 3GPP TSG RAN WG1 Meeting #68bis (R1-121260); Jeju, Korea; Mar. 26-30, 2012; 6 pages.
International Search Report and Written Opinion of the International Searching Authority issued in PCT/US2013/036556 on Jun. 3, 2013; 12 pages.
International Preliminary Report on Patentability under Chapter I issued in International Application No. PCT/US2013/036553 on Oct. 30, 2014; 9 pages.

\* cited by examiner

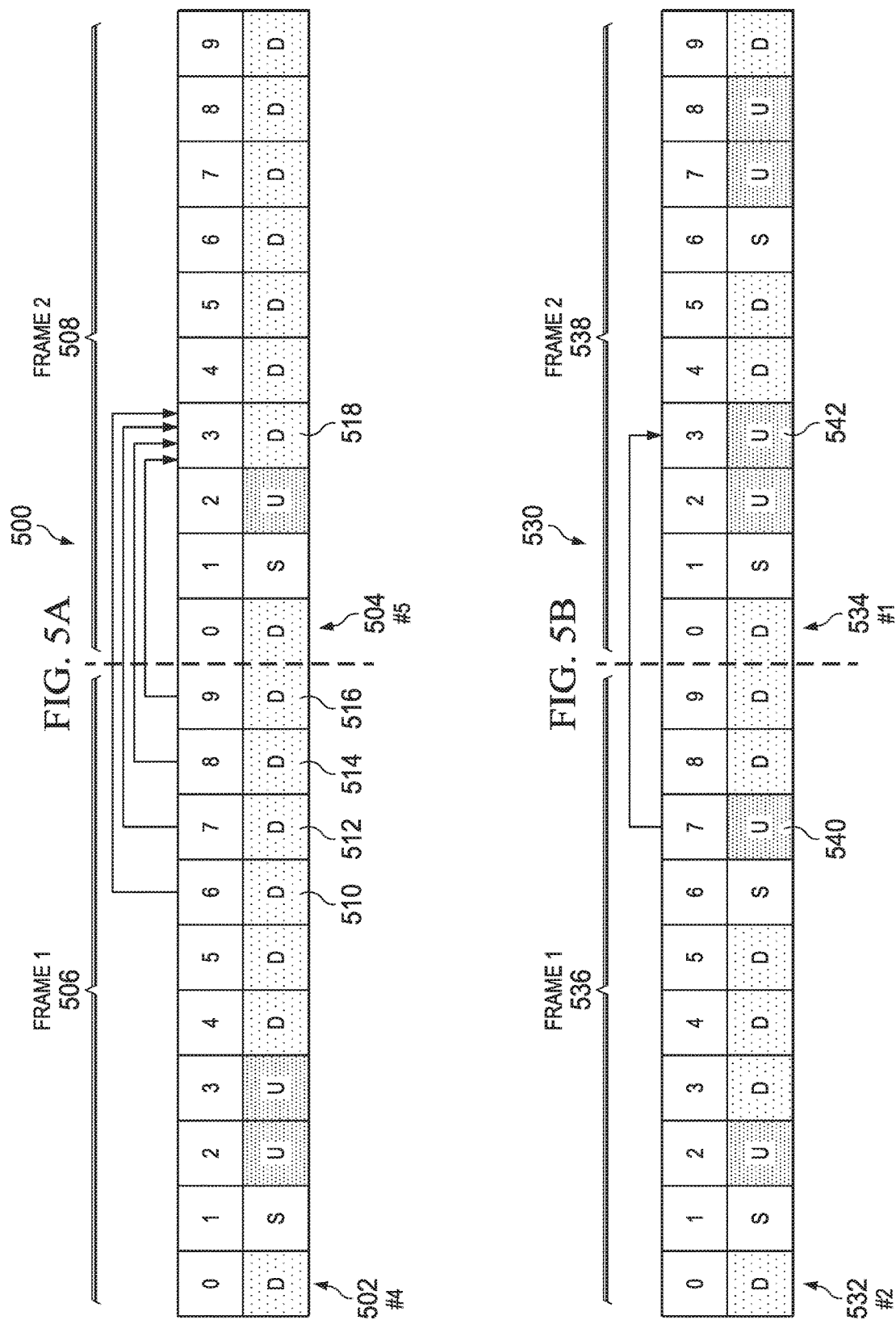

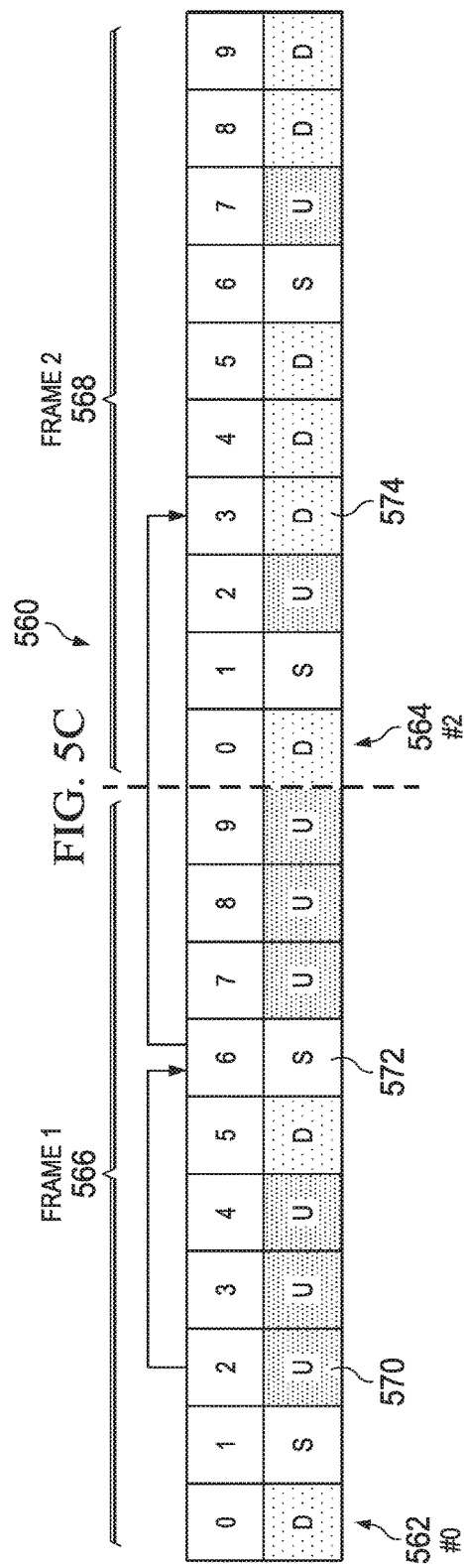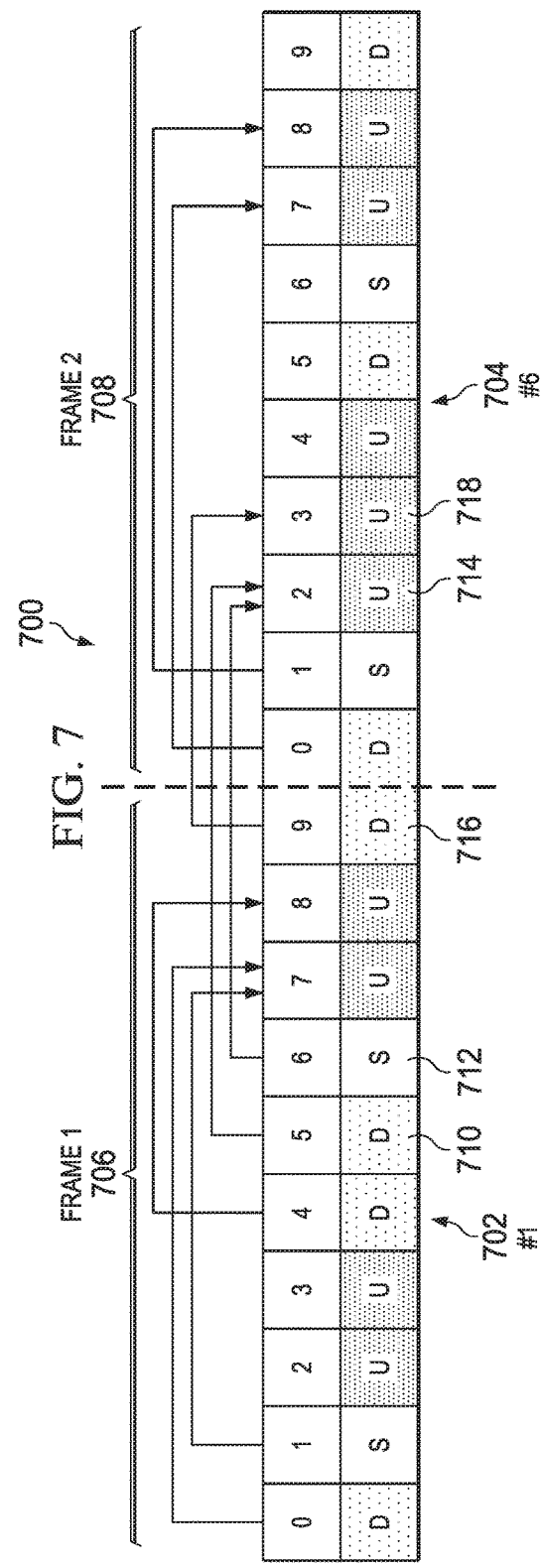

FIG. 6 — Table 600

| ORIGINAL UL/DL CONFIGURATION | UL/DL CONFIGURATION AFTER CHANGE | | | | | | |
|---|---|---|---|---|---|---|---|
| | 0 | 1 | 2 | 3 | 4 | 5 | 6 |
| 0 | 608 (shaded) | shaded | shaded | shaded | shaded | shaded | shaded |
| 1 | shaded | | X | shaded | | X | |
| 2 | shaded | | | X | X | X | shaded |
| 3 | shaded | X | X | | X | X | |
| 4 | shaded | | | X | | X | |
| 5 | shaded | shaded | shaded | shaded | shaded | | shaded |
| 6 | shaded | X | X | shaded | X | X | |

604 — row indicator; 606 — column/X indicator; 608 — highlighted cell

FIG. 8 — Table 800

| ORIGINAL UL/DL CONFIGURATION | UL/DL CONFIGURATION AFTER CHANGE | | | | | | |
|---|---|---|---|---|---|---|---|
| | 0 | 1 | 2 | 3 | 4 | 5 | 6 |
| 0 | | shaded | X | shaded | | X | shaded |
| 1 | X | | X | X | shaded | X | X |
| 2 | X | X | | X | X | shaded | X |
| 3 | shaded | | X | | shaded | X | shaded |
| 4 | shaded | | X | shaded | | X | shaded |
| 5 | shaded | shaded | shaded | shaded | shaded | | shaded |
| 6 | shaded | X | X | shaded | X | X | |

802 — row 0; 804 — row 1; 806 — row 6

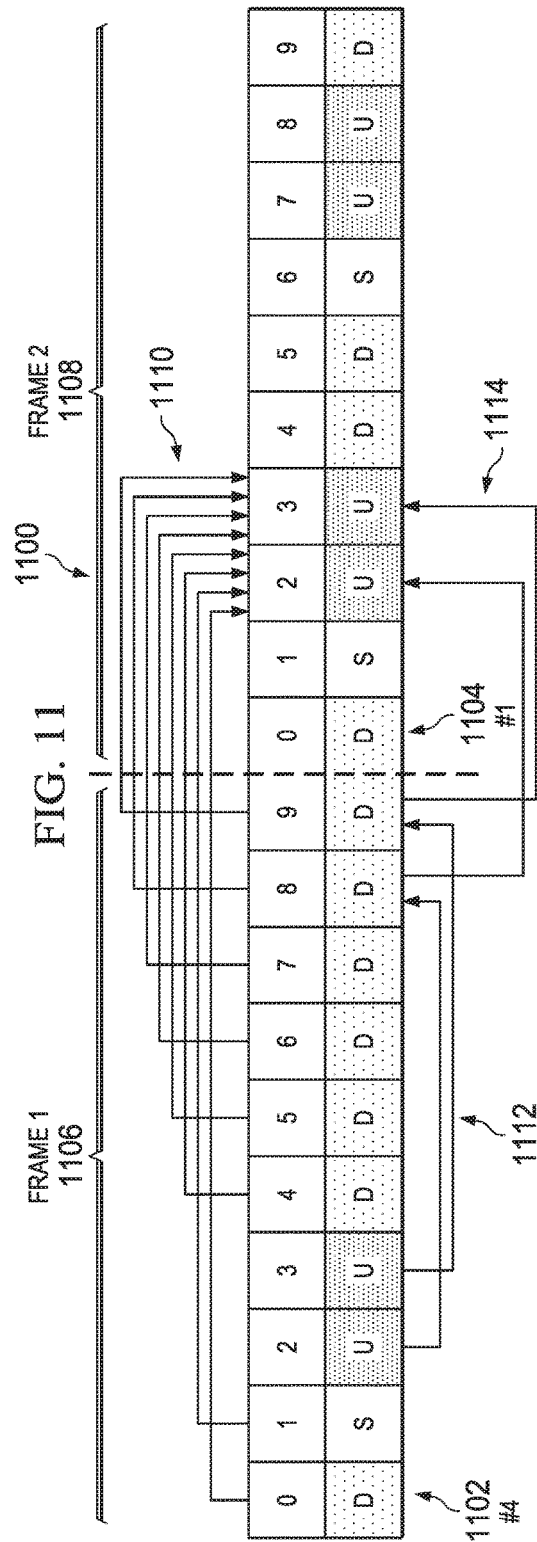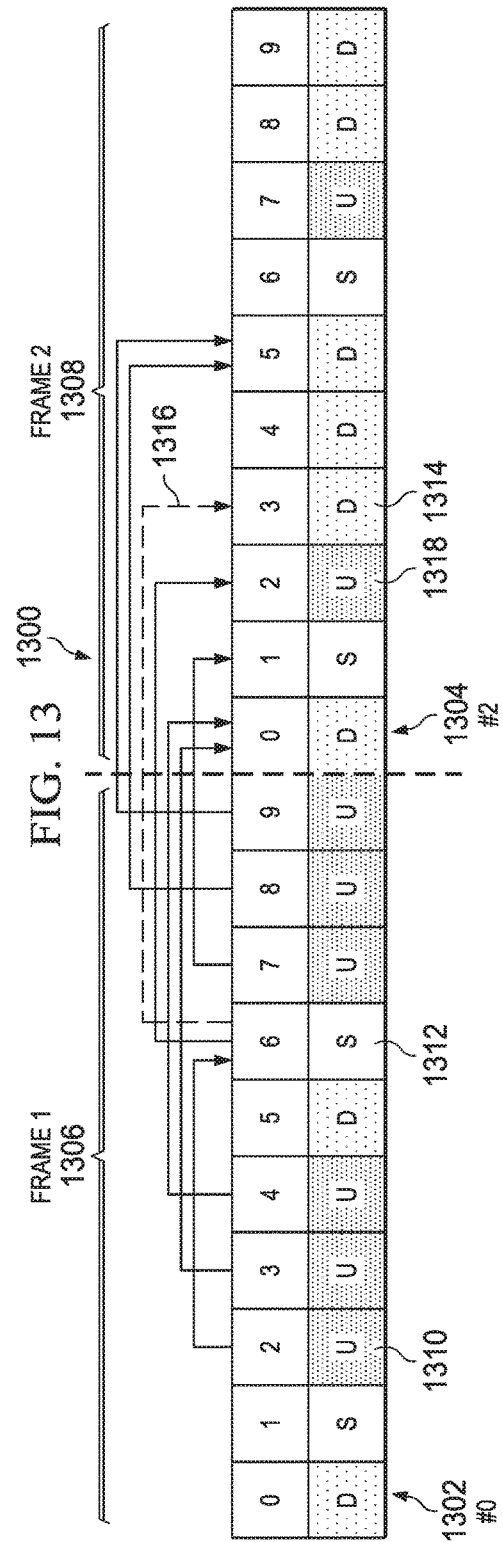

| ORIGINAL UL/DL CONFIGURATION | UL/DL CONFIGURATION AFTER CHANGE | | | | | | |
|---|---|---|---|---|---|---|---|
| | 0 | 1 | 2 | 3 | 4 | 5 | 6 |
| 0 | | | | | | | |
| 1 | X | | | X | | | X |
| 2 | X | X | | X | X | | X |
| 3 | | | | | | | |
| 4 | | | | | | | |
| 5 | | | | | | | |
| 6 | | | | | | | |

FIG. 14

| ORIGINAL UL/DL CONFIGURATION | UL/DL CONFIGURATION AFTER CHANGE | | | | | | |
|---|---|---|---|---|---|---|---|
| | 0 | 1 | 2 | 3 | 4 | 5 | 6 |
| 0 | | | | | | | |
| 1 | X | | X | X | | X | X |
| 2 | X | X | | X | X | X | X |
| 3 | | X | X | | X | X | |
| 4 | | | X | | | X | |
| 5 | | | | | | | |
| 6 | | X | X | | X | X | |

FIG. 15

HARQ FOR DYNAMIC CHANGE OF THE TDD UL/DL CONFIGURATION IN LTE TDD SYSTEMS

FIELD

The present disclosure pertains to reconfiguration of time division duplex (TDD) uplink/downlink (UL/DL) configuration, and more particularly, to hybrid automatic repeat request (HARQ) for dynamic changes of TDD UL/DL configuration in Long Term Evolution (LTE) TDD systems.

BACKGROUND

In wireless communications systems, such as long term evolution (LTE) systems, downlink and uplink transmissions may be organized into two duplex modes: frequency division duplex (FDD) mode and time division duplex (TDD) mode. The FDD mode uses a paired spectrum where the frequency domain is used to separate the uplink (UL) and downlink (DL) transmissions. FIG. 1A is a graphical illustration of a UL and DL subframe separated in the frequency domain for the FDD mode. In TDD systems, an unpaired spectrum may be used where both UL and DL are transmitted over the same carrier frequency. The UL and DL are separated in the time domain. FIG. 1B is a graphical illustration of uplink and downlink subframes sharing a carrier frequency in the TDD mode.

DESCRIPTION OF THE DRAWINGS

FIG. 5A is an example schematic illustration showing a DL HARQ case for configuration change from configuration 4 to configuration 5.

FIG. 5B is an example schematic illustration showing a UL HARQ case for configuration change from configuration 2 to configuration 1.

FIG. 5C is an example schematic illustration showing UL HARQ case for configuration change from configuration 0 to configuration 2.

FIG. 6 is a configuration change map for consideration of DL HARQ timing in accordance with the present disclosure.

FIG. 7 is a schematic illustration showing an example of a DL HARQ timing linkage transition during the TDD UL/DL configuration change from configuration 1 to configuration 6 in accordance to the present disclosure.

FIG. 8 is a configuration change map for consideration of UL HARQ and UL grant timing in accordance with the present disclosure.

FIG. 11 is a schematic illustration showing an example of a UL and DL timing linkage transition during UL/DL configuration 4 change to configuration 1 in accordance to the present disclosure.

FIG. 13 is an example schematic illustration showing PUSCH adaptive retransmission during reconfiguration of UL/DL configuration 0 to configuration 2.

FIG. 14 is a configuration change map for UL HARQ and grant timing consideration with adaptive PUSCH retransmission in accordance with the present disclosure.

FIG. 15 is a configuration change map for consideration of both DL and UL timing with adaptive PUSCH retransmission in accordance with the present disclosure.

DETAILED DESCRIPTION

Figure 1A:
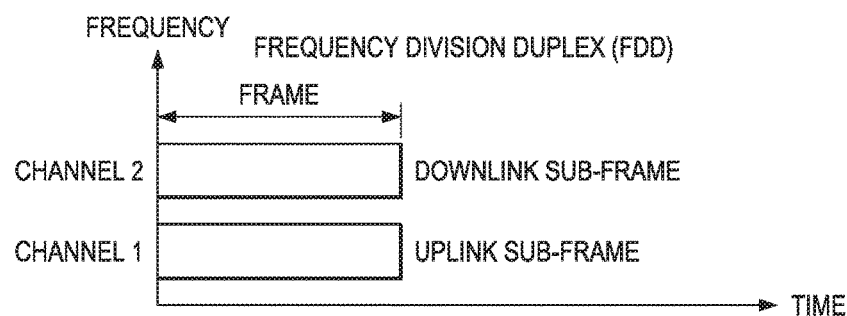
FIG. 1A is a graphical illustration of an uplink and downlink subframe separated in the frequency domain for the FDD mode.
Figure 1B:
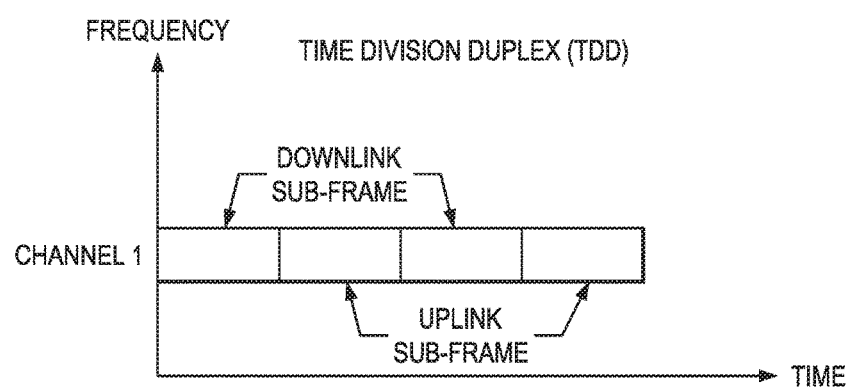
FIG. 1B is a graphical illustration of uplink and downlink subframes sharing a carrier frequency in the TDD mode.

Aspects of the present disclosure involve systems, apparatuses, and methods for reconfiguring a time division duplex (TDD) uplink/downlink (UL/DL) configuration. A first TDD UL/DL configuration can be identified for a first radio frame. A second TDD UL/DL configuration can be identified for a second radio frame adjacent the first radio frame. The second TDD UL/DL configuration identified based, at least in part, on one or more subframes of the second TDD UL/DL configuration that can communicate hybrid automatic repeat request (HARQ) acknowledgement/negative acknowledgement (ACK/NACK) indicators for corresponding subframes of the first TDD UL/DL configuration. The TDD UL/DL configuration can be reconfigured based on the identified second TDD UL/DL configuration.

In certain aspects of the implementations, the second TDD UL/DL configuration may support a greater or equal number of HARQ processes than the first TDD UL/DL configuration.

In certain aspects of the implementations, the first TDD UL/DL configuration supports a greater number of HARQ processes than the second TDD UL/DL configuration. The first TDD UL/DL configuration may be associated with a first number of HARQ processes, and the method may further include maintaining, at least temporarily, the first number of HARQ processes for the second TDD UL/DL configuration. The second TDD UL/DL configuration may be associated with a second number of HARQ buffers. Aspects may also include executing a second number of HARQ processes associated with the first TDD UL/DL configuration, the second number of HARQ processes equal to the second number of HARQ buffers. Aspects may also include communicating an ACK indicator prior to the reconfiguring of the TDD UL/DL configuration.

Certain aspects of the disclosure may also include completing a HARQ process for physical downlink/uplink shared channel prior to reconfiguration from the first TDD UL/DL configuration to the second TDD UL/DL configuration. Certain aspects may also include controlling the number of HARQ processes for physical downlink/uplink shared channel prior to reconfiguration from the first TDD UL/DL configuration to the second TDD UL/DL configuration.

In certain aspects of the implementations the HARQ processes are uplink (UL) HARQ processes. Certain aspects include storing excess UL HARQ processes in a queue and upon receiving a negative new data indicator, executing a first UL HARQ process of the UL HARQ processes stored in the queue.

Aspects of the present disclosure involve systems, apparatuses, and methods for identifying a first time division duplex (TDD) uplink/downlink (UL/DL) configuration for a first radio frame. It may be determined that a hybrid automatic repeat request (HARQ) acknowledgement/negative acknowledgement (ACK/NACK) indicator is to be transmitted on a second radio frame adjacent the first radio frame. A second TDD UL/DL configuration can be identified for the second radio frame based, at least in part, on the TDD UL/DL configuration of the first radio frame. In certain aspects of the implementations, the second TDD UL/DL configuration includes a corresponding subframe for communicating the ACK/NACK indicator. In certain aspects of the disclosure, identifying the second TDD UL/DL configuration may include identifying a subset of TDD UL/DL configurations available for communicating an ACK/NACK indicator for one or more subframes of the first TDD UL/DL configuration.

Aspects of the present disclosure involve systems, apparatuses, and methods performed at a base station of a wireless communications network for receiving a physical uplink shared channel (PUSCH). It may be determined that the PUSCH was decoded incorrectly. It may also be determined that a change in time division duplex TDD uplink/downlink UL/DL configuration is required. A new TDD UL/DL configuration can be identified, the new TDD UL/DL configuration associated with a new uplink (UL) timing. A UL grant may be sent for PUSCH retransmission based on a UL grant timing of the current configuration. In certain aspects of the implementations, the UL grant is sent using a downlink control information (DCI) message. In certain aspects of the implementations, sending the UL grant for PUSCH retransmission may also include sending a negative new data indicator.

The details of one or more embodiments of the invention are set forth in the accompanying drawings and the description below. Other features, objects, and advantages of the invention will be apparent from the description and drawings, and from the claims. For example, the present disclosure facilitates a smooth transition of both DL and UL HARQ timing linkage during the change of different TDD UL/DL configurations. The configuration map provided herein can minimize UE confusions on possible error scenarios and facilitate conformance tests.

Figure 2:
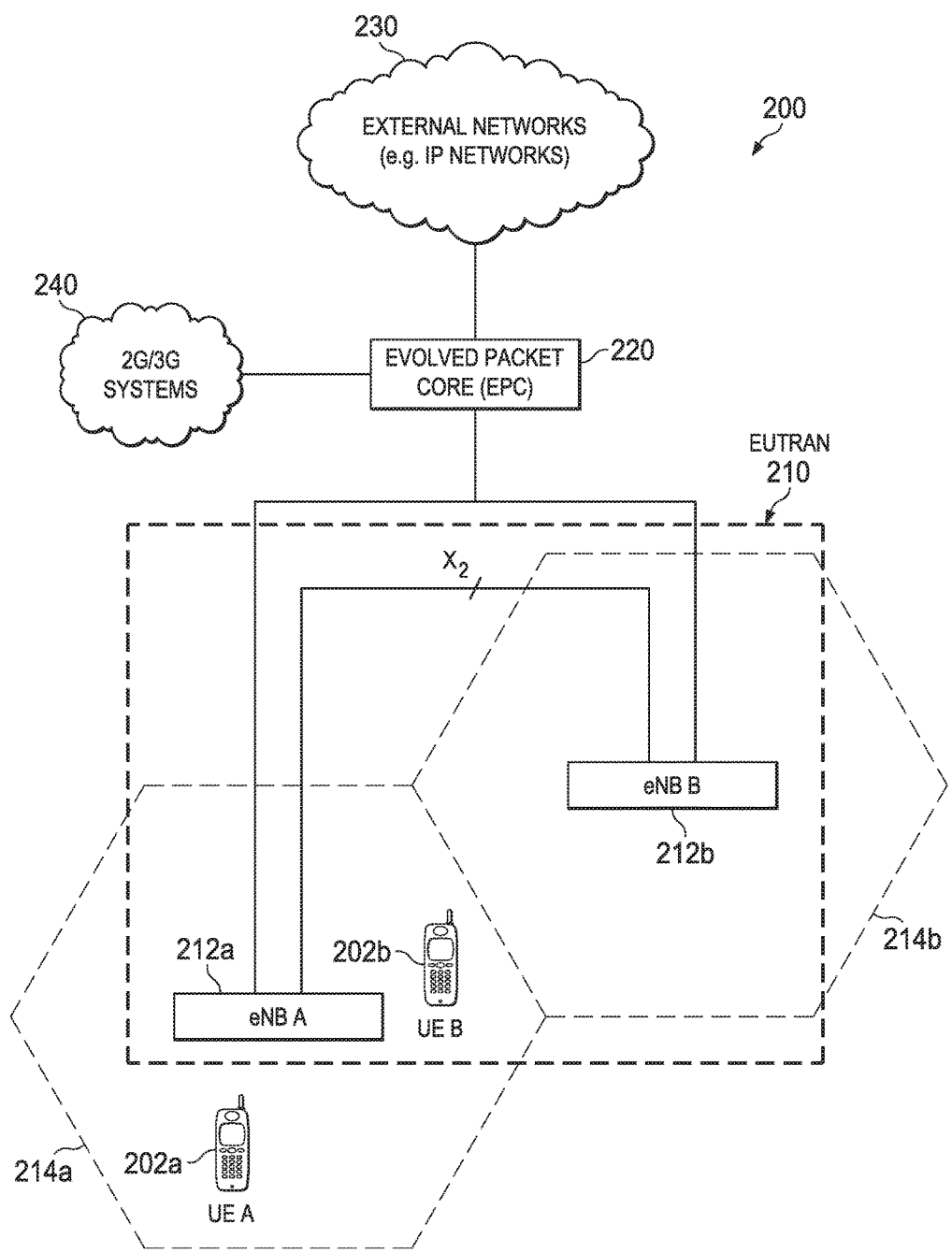
FIG. 2 is a schematic representation of an example wireless cellular communication system based on $3^{rd}$ Generation Partnership Project Long Term Evolution (LTE).

Mobile electronic devices may operate in a communications network, such as the network shown in FIG. 2, which is based on the third generation partnership project (3GPP) long term evolution (LTE), also known as Evolved Universal Terrestrial Radio Access (E-UTRA). More specifically, FIG. 2 is a schematic representation of an example wireless communication system 200 based on 3GPP LTE. The system 200 shown in FIG. 2 includes a plurality of base stations 212 (i.e., 212a and 212b). In the LTE example of FIG. 2, the base stations are shown as evolved Node B (eNB) 212a,b. In this disclosure, references to eNB are intended to refer to an access node device, such as a base station or any other communications network node that provides service to a mobile station including femtocell, picocell, or the like. The example wireless communication system 200 of FIG. 2 may include one or a plurality of radio access networks 210, core networks (CNs) 220, and external networks 230. In certain implementations, the radio access networks may be Evolved Universal Mobile Telecommunications System (UMTS) terrestrial radio access networks (EUTRANs). In addition, in certain instances, core networks 220 may be evolved packet cores (EPCs). Further, there may be one or more mobile electronic devices 202 obtaining communication services via the example wireless communication system 200. In some implementations, 2G/3G systems 240, e.g., Global System for Mobile communication (GSM), Interim Standard 95 (IS-95), Universal Mobile Telecommunications System (UMTS) and CDMA2000 (Code Division Multiple Access) may also be integrated into the communication system 200.

In the example LTE system shown in FIG. 2, the EUTRAN 210 includes eNB 212a and eNB 212b. Cell 214a is the service area of eNB 212a and Cell 214b is the service area of eNB 212b. The term cell is intended to describe a coverage area associated with a base station regardless and may or may not overlap with the coverage areas associated with other base stations. In FIG. 2, User Equipment (UE) 202a and UE 202b operate in Cell 214a and are served by eNB 212a. The EUTRAN 210 can include one or a plurality of eNBs 212 and one or a plurality of UEs can operate in a cell. The eNBs 212 communicate directly to the UEs 202. In some implementations, the eNB 212 may be in a one-to-many relationship with the UE 202, e.g., eNB 212a in the example LTE system 200 can serve multiple UEs 202 (i.e., UE 202a and UE 202b) within its coverage area Cell 214a, but each of UE 202a and UE 202b may be connected only to one eNB 212a at a time. In some implementations, the eNB 212 may be in a many-to-many relationship with the UEs 202, e.g., UE 202a and UE 202b can be connected to eNB 212a and eNB 212b. The eNB 212a may be connected to eNB 212b with which handover may be conducted if one or both of UE 202a and UE 202b travels from cell 214a to cell 214b. UE 202 may be any communications device used by an end-user to communicate, for example, within the LTE system 200. The UE 202 may alternatively be referred to as mobile electronic device, user equipment, user device, mobile device, mobile station, subscriber station, or wireless terminal. In some embodiments, UE 202 may be a cellular phone, personal data assistant (PDA), smart phone, laptop, tablet personal computer (PC), pager, portable computer, or other types of mobile communications device, including communications apparatus used in wirelessly connected automobiles, appliances, or clothing.

UEs 202 may transmit voice, video, multimedia, text, web content and/or any other user/client-specific content. On the one hand, the transmission of some of these contents, e.g., video and web content, may require high channel throughput to satisfy the end-user demand On the other hand, the channel between UEs 202 and eNBs 212 may be contaminated by multipath fading, due to the multiple signal paths arising from many reflections in the wireless environment. Accordingly, the UEs' transmission may adapt to the wireless environment. In short, UEs 202 generate requests, send responses or otherwise communicate in different means with Enhanced Packet Core (EPC) 220 and/or Internet Protocol (IP) networks 230 through one or more eNBs 212.

A radio access network is part of a mobile telecommunication system which implements a radio access technology, such as UMTS, CDMA2000, and 3GPP LTE. In many applications, the Radio Access Network (RAN) included in a LTE telecommunications system 200 is called an EUTRAN 210. The EUTRAN 210 can be located between UEs 202 and EPC 220. The EUTRAN 210 includes at least one eNB 212. The eNB can be a radio base station that may control all or at least some radio related functions in a fixed part of the system. The at least one eNB 212 can provide radio interface within their coverage area or a cell for UEs 202 to communicate. eNBs 212 may be distributed throughout the communications network to provide a wide area of coverage. The eNB 212 directly communicates to one or a plurality of UEs 202, other eNBs, and the EPC 220.

The eNB 212 may be the end point of the radio protocols towards the UE 202 and may relay signals between the radio connection and the connectivity towards the EPC 220. In certain implementations, the EPC 220 is the main component of a core network (CN). The CN can be a backbone network, which may be a central part of the telecommunications system. The EPC 220 can include a mobility management entity (MME), a serving gateway (SGW), and a packet data network gateway (PGW). The MME may be the main control element in the EPC 220 responsible for the functionalities including the control plane functions related to subscriber and session management. The SGW can serve as a local mobility anchor, such that the packets are routed through this point for intra EUTRAN 210 mobility and mobility with other legacy 2G/3G systems 240. The SGW functions may include the user plane tunnel management and switching. The PGW may provide connectivity to the services domain including external networks 230, such as the IP networks. The UE 202, EUTRAN 210, and EPC 220 are sometimes referred to as the evolved packet system (EPS). It is to be understood that the architectural evolvement of the LTE system 200 is focused on the EPS. The functional evolution may include both EPS and external networks 230.

Though described in terms of FIG. 2, the present disclosure is not limited to such an environment. In general, telecommunication systems may be described as communications networks made up of a number of radio coverage areas, or cells that are each served by a base station or other fixed transceiver. Example telecommunication systems include Global System for Mobile Communication (GSM) protocols, Universal Mobile Telecommunications System (UMTS), 3GPP Long Term Evolution (LTE), and others. In addition to telecommunication systems, wireless broadband communication systems may also be suitable for the various implementations described in the present disclosure. Example wireless broadband communication systems include IEEE 802.11 wireless local area network, IEEE 802.16 WiMAX network, etc.

Figure 3:
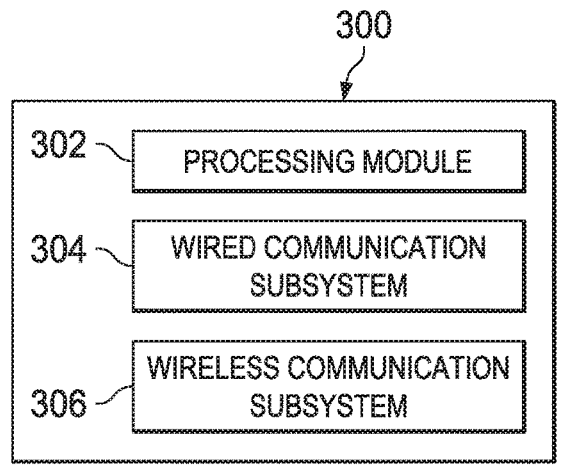
FIG. 3 is a schematic block diagram illustrating an access node device according to one embodiment.

Referring to FIG. 3, a schematic block diagram illustrating an access node device (for example, eNB 212a in FIG. 2) according to one embodiment will be described below. The illustrated device 300 includes a processing module 302, a wired communication subsystem 304, and a wireless communication subsystem 306. The processing module 302 can include a processing component (alternatively referred to as "processor" or "central processing unit (CPU)") capable of executing instructions related to one or more of the processes, steps, or actions described above in connection with one or more of the embodiments disclosed herein. The processing module 302 can also include other auxiliary components, such as random access memory (RAM), read only memory (ROM), secondary storage (for example, a hard disk drive or flash memory). The processing module 302 can execute certain instructions and commands to provide wireless or wired communication, using the wired communication subsystem 304 or the wireless communication subsystem 306. A skilled artisan will readily appreciate that various other components can also be included in the device 300.

Figure 4:
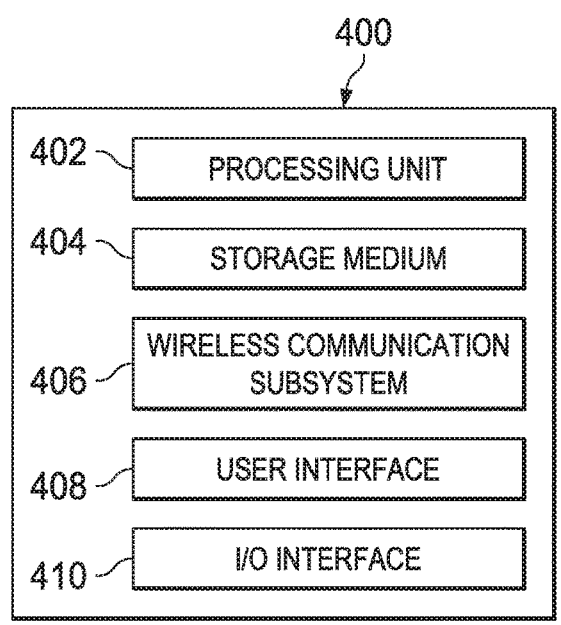
FIG. 4 is a schematic block diagram illustrating a user equipment device according to one embodiment.

FIG. 4 is a schematic block diagram illustrating a user equipment device (for example, UEs 202a, 202b in FIG. 2) according to one embodiment. The illustrated device 400 includes a processing unit 402, a computer readable storage medium 404 (for example, ROM or flash memory), a wireless communication subsystem 406, a user interface 408, and an I/O interface 410.

Similar to the processing module 302 of FIG. 3, the processing unit 402 can include a processing component configured to execute instructions related to one or more of the processes, steps, or actions described above in connection with one or more of the embodiments disclosed herein. The processing unit 402 can also include other auxiliary components, such as random access memory (RAM) and read only memory (ROM). The computer readable storage medium 404 can store an operating system (OS) of the device 400 and various other computer executable software programs for performing one or more of the processes, steps, or actions described above.

The wireless communication subsystem 406 is configured to provide wireless communication for data and/or control information provided by the processing unit 402. The wireless communication subsystem 406 can include, for example, one or more antennas, a receiver, a transmitter, a local oscillator, a mixer, and a digital processing (DSP) unit. In some embodiments, the wireless communication subsystem 406 can support a multiple input multiple output (MIMO) protocol.

The user interface 408 can include, for example, a screen or touch screen (for example, a liquid crystal display (LCD), a light emitting display (LED), an organic light emitting display (OLED), a microelectromechanical system (MEMS) display), a keyboard or keypad, a trackball, a speaker, or a microphone. The I/O interface 410 can include, for example, a universal serial bus (USB) interface. A skilled artisan will readily appreciate that various other components can also be included in the device 400.

In the 3GPP LTE TDD system, a subframe of a radio frame can be a downlink, an uplink or a special subframe (the special subframe includes downlink and uplink time regions separated by a guard period for downlink to uplink switching). The 3GPP specification defines seven different UL/DL configuration schemes in LTE TDD operations. They are listed in Table 1. The letter "D" represents downlink subframes; the letter "U" is for uplink subframes. The letter "S" is the special frame, which includes three parts, i) the downlink pilot time slot (DwPTS), ii) the uplink pilot time slot (UpPTS) and iii) the guard period (GP). Downlink transmissions on the PDSCH may be made in DL subframes or in the DwPTS portion of a special subframe.

TABLE 1

LTE TDD Uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As Table 1 shows, there are two switching point periodicities specified in the LTE standard, 5 ms and 10 ms. The 5 ms switching point periodicity is introduced to support the co-existence between LTE and low chip rate UTRA TDD systems and 10 ms switching point periodicity is for the coexistence between LTE and high chip rate UTRA TDD system. The supported configurations cover a wide range of UL/DL allocations from DL heavy 1:9 ratio to UL heavy 3:2 ratio. (The DL allocations in these ratios include both DL subframes and special subframes (which can also carry downlink transmissions in DwPTS).) Therefore, compared to FDD, TDD systems have more flexibility in terms of the proportion of resources assignable to uplink and downlink communications within a given assignment of spectrum. Specifically, it is possible to distribute the radio resources unevenly between uplink and downlink. This will provide a way to utilize the radio resources more efficiently by selecting an appropriate UL/DL configuration based on interference situation and different traffic characteristics in DL and UL.

Because the UL and DL transmissions are not continuous (i.e., UL (or DL) transmissions do not occur in every subframe) in an LTE TDD system, the scheduling and HARQ timing relationships are separately defined in the specifications. Currently, the HARQ acknowledgement/negative acknowledgement (ACK/NACK) timing relationship for downlink is shown in Table 2 below. Table 2 associates a UL sub-frame n, which conveys ACK/NACK, with DL sub-frames n−$k_i$, i=0 to M−1.

TABLE 2

Downlink association set index K: {$k_0$, $k_1$, ... $k_{m-1}$}

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The uplink HARQ ACK/NACK timing linkage is shown in Table 3 below. It indicates that the Physical HARQ Indicator Control Channel (PHICH) ACK/NACK received in DL sub-frame i is linked with the UL data transmission in UL sub-frame i−k, k is given in Table 3. In addition, for UL/DL configuration 0, in sub-frames 0 and 5, when $I_{PHICH}$=1, k=6. This is because there may be two ACK/NACKs for a UE transmitted on the PHICH in subframes 0 and 5, one is represented by $I_{PHICH}$=1, the other is $I_{PHICH}$=0.

TABLE 1 k for HARQ ACK/NACK

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

The UL grant, ACK/NACK and transmission/retransmission relationship is shown in Table 4. The UE shall upon detection of a Physical Downlink Control Channel (PDCCH) with DCI format 0 and/or a PHICH transmission in sub-frame n intended for the UE, adjust the corresponding PUSCH transmission in sub-frame n+k, where k is given in Table 4. For TDD UL/DL configuration 0, if the least significant bit (LSB) of the UL index in the DCI format 0 is set to 1 in sub-frame n or a PHICH is received in sub-frame n=0 or 5 in the resource corresponding to $I_{PHICH}$=1, or PHICH is received in sub-frame n=1 or 6, the UE shall adjust the corresponding PUSCH transmission in sub-frame n+7. If, for TDD UL/DL configuration 0, both the most significant bit (MSB) and LSB of the UL index in the DCI format 0 are set in sub-frame n, the UE shall adjust the corresponding PUSCH transmission in both sub-frames n+k and n+7, where k is given in Table 4.

TABLE 4 k for PUSCH transmission

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Both grant and HARQ timing linkage in TDD are much more complicated than the fixed time linkages used in an LTE FDD system. It usually requires more attention in design. Unlike in LTE FDD, the maximum numbers of DL and UL HARQ processes per serving cell varies with the TDD UL/DL configuration. This is mainly because the DL and UL subframe distribution is different for different UL/DL configurations. The maximum number of downlink HARQ processes per serving cell shall be determined by the TDD UL/DL configuration, as indicated in Table 5.

TABLE 5

Maximum number of DL HARQ processes for TDD

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

For the uplink, the number of HARQ processes per serving cell shall be determined by the DL/UL configuration, as indicated in the Table 6 below.

TABLE 6

Number of synchronous UL HARQ processes for TDD

| TDD UL/DL configuration | Number of HARQ processes for normal HARQ operation |
|---|---|
| 0 | 7 |
| 1 | 4 |
| 2 | 2 |
| 3 | 3 |
| 4 | 2 |
| 5 | 1 |
| 6 | 6 |

Whenever the UL/DL configuration is changed, the number of HARQ processes has to be changed accordingly to match to the current configuration. This is true for both uplink and downlink.

In the current LTE specification, the TDD UL/DL configuration is assumed to be fixed. For certain deployment scenarios, such as Femto or Pico cell, the number of UEs per cell is small and it means that the overall traffic ratio between UL and DL in the cell may change rapidly. The fixed UL/DL configuration may lead to inefficient use of system radio resource in this kind of traffic characteristics. There may also be a need to dynamically change the TDD configuration from interference avoidance perspective. Moreover, the faster UL/DL reconfiguration may lead to better performance even up to 10 ms in some scenarios. However, there may be issues on HARQ associated with the TDD configuration change. It is mainly because the HARQ timing linkage varies with different UL/DL configurations in LTE TDD systems.

As the UL/DL TDD configuration changes, some subframes in the frame will change direction, such as from UL to DL and/or vice versa, from frame to frame. Therefore, there are issues with both downlink and uplink HARQ ACK/NACK transmission. An example case for a DL HARQ is provided in FIG. 5A, where there is a TDD UL/DL configuration change from configuration 4 to configuration 5. FIG. 5A is an example schematic illustration 500 showing a DL HARQ case for configuration change from configuration 4 502 to configuration 5 504. For UL/DL configuration 4 502, which is for radio frame 1 506, the ACK/NACKs for DL PDSCH transmission at subframes #6 510, #7 512, #8 514, and #9 516 are all linked to the UL subframe #3 518 in radio frame 508. However, with the configuration change, subframe #3 518 for UL/DL configuration #5 504 is a DL subframe. It cannot be used to send ACK/NACK on the UL direction.

FIG. 5B is an example schematic illustration 530 showing a UL HARQ case for configuration change from configuration 2 532 to configuration 1 534. For configuration 2 532 in radio frame 1 536, the ACK/NACK for PUSCH at subframe #7 540 is supposed to transmitted at DL subframe #3 542 of the radio frame 2 538. But the subframe #3 542 is no longer a DL subframe with the change to TDD UL/DL configuration 1 534. As such, the UL ACK/NACK cannot be transmitted on subframe #3 542. In the UL, the situation is more complicated than the DL because the UL HARQ in LTE is synchronous. The PUSCH HARQ timing association is considered in addition to the transmission and retransmission grant timing linkage during the TDD UL/DL configuration change. FIG. 5C is an example schematic illustration 560 showing UL HARQ case for configuration change from configuration 0 562 to configuration 2 564. For configuration 0 562, the ACK/NACK for PUSCH at subframe #2 570 is received at subframe #6 572 of the radio frame 1 566. If it is a NACK, the PUSCH retransmission needs to be happened at subframe #3 574 in the following radio frame 2 568. As the change of TDD UL/DL configuration 0 562 to configuration 2 564 occurs, however, the subframe #3 574 becomes DL subframe. It is not possible to perform the PUSCH retransmission any more.

A change of TDD UL/DL configuration may lead to problems in both DL and UL HARQ timing linkage. If the change of UL/DL configuration does not happen often, all of the on-going HARQ processes may simply be terminated by declaring packet reception error and passing the error onto the upper layer. However, this solution would cause increased delay of traffic and decreased efficiency of radio resource usage. In 3GPP RAN1, the rate of reconfiguration under discussion is in the range from 10 ms to 640 ms. With this kind of change rate, it is not feasible to simply terminate the HARQ process every time when there is a change of configuration.

Aspects of the present disclosure are directed to ensuring that both DL and UL HARQ timing linkage do not break when the TDD UL/DL configuration is changed. Aspects of the present disclosure are directed to ensuring the continuation of HARQ timing relationship for both downlink and uplink HARQs during reconfiguration by, for example, limiting the combination of TDD UL/DL configuration that can change from one to the other. Aspects of the disclosure are directed to using PUSCH adaptive retransmission during the UL/DL reconfiguration in addition to limiting the combination of TDD UL/DL configuration combinations. In this way, the reconfiguration flexibility can increase without breaking the HARQ timing both on downlink and uplink.

To streamline the TDD UL/DL configuration change, we have to make sure that the continuation of HARQ timing relationship for both downlink and uplink HARQs when the system changes the TDD UL/DL configuration from one to another.

For DL HARQ timing, every PDSCH transmission or retransmission should be properly ACKed/NACKed after the TDD UL/DL configuration change. Basically, to minimize the specification change, each PDSCH subframe follows the DL HARQ timing of the UL/DL configuration where the DL subframe is transmitted. FIG. 6 is a configuration change map 600 for DL HARQ timing consideration in accordance with the present disclosure. The map 600 shows TDD UL/DL configuration combinations for reconfiguring TDD UL/DL configuration. The greyed cells (such as cell 604) indicate the allowable change combination. Cells with an X (such as cell 606) represent that the change is not allowed in terms of DL HARQ timing consideration. For example, UL/DL configuration 0 is allowed to change to any other configuration; while UL/DL configuration 1 cannot change to configuration 2 and 5. Blank cells (such as cell 608) represent null entries showing no change in the configurations (i.e., configuration 0 to configuration 0, and so on).

FIG. 7 is a schematic illustration 700 showing an example of a DL HARQ timing linkage transition during the TDD UL/DL configuration change from configuration 1 702 to configuration 6 704 in accordance to the present disclosure. As shown in FIG. 7, this UL/DL reconfiguration does not cause problems in DL HARQ timing. For UL/DL configuration 1 702, which is for radio frame 1 706, the ACK/NACKs for DL PDSCH transmission at subframes #5 710 and #6 712 are linked to the UL subframe #2 714 in radio frame 2 708, which has changed to configuration 6 704. Similarly, the DL PDSCH transmission at subframe #9 716 is linked to uplink subframe #3 718. The number of HARQ processes changes as the TDD UL/DL configuration changes. For DL HARQ process, it is an asynchronous process and each DL grant specifies the HARQ index number. When the number of HARQ processes changes to a larger or the same number after reconfiguration, the current n DL HARQ buffer(s) should be able to directly transfer to the first n HARQ buffer(s) of the DL HARQ processes after reconfiguration. When the number of HARQ processes changes to a smaller number due to reconfiguration, for example, as shown in FIG. 7 where the number of DL HARQ processes is seven for configuration 1 and it is six for configuration 6, there are ways of addressing the issue. For example, the new configuration may at least temporarily, keep the same number of HARQ buffers as the previous configuration or may reduce the number of HARQ buffers to the same as the current configuration suggests by allowing the excessive number of HARQ processes to complete. The eNB may use a conservative modulation and coding scheme (MCS) to send the PDSCH to make sure that the UE will receive it correctly and complete the HARQ transmission before the UL/DL configuration change in order to make the number of HARQ processes equal to the specified number after the change. The eNB may control the number of HARQ processes to the specified number after the change by purposely not scheduling new data transmission that could initiate a new HARQ process. The UE may send an ACK regardless of the result of decoding right before the configuration change to terminate the excessive number of HARQ processes. The packet error could be passed onto the upper layer. Each above proposed schemes can be a standalone implementation.

In UL, the situation is more complex than the DL situation because of the synchronous nature of UL HARQ in LTE. The PUSCH HARQ timing association may be considered as well as the transmission and retransmission grant timing linkage during the TDD UL/DL configuration change. Similar to the DL consideration, to minimize the specification change, each PUSCH UL HARQ and grant (including retransmission grant) may follow the UL HARQ and grant timing scheme of the UL/DL configuration where the UL transmission and UL grant are transmitted. From the viewpoint of UL HARQ, a DL subframe has to be available at the time when a UL HARQ needs to be transmitted with the change of TDD UL/DL configuration.

Figure 9:
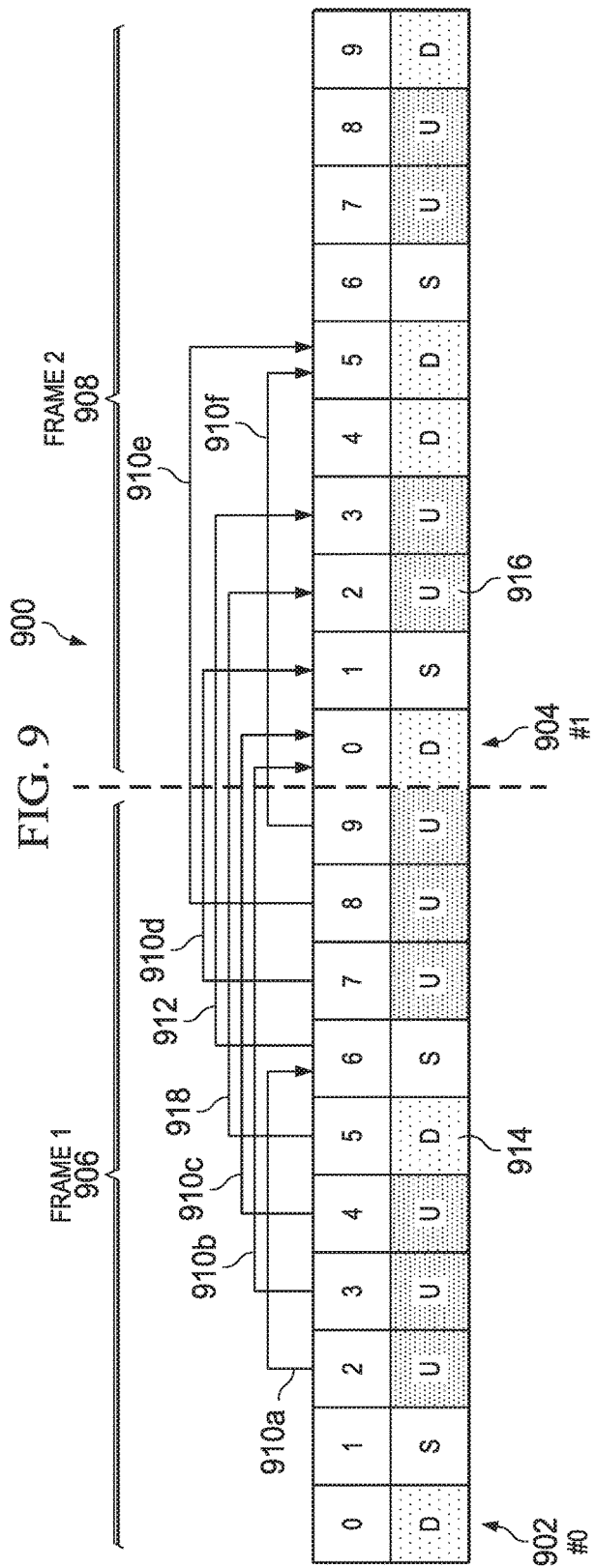
FIG. 9 is a schematic illustration showing an example of a UL HARQ and retransmission timing during UL/DL configuration 0 in radio frame 1 change to configuration 1 in radio frame 2 in accordance to the present disclosure.

FIG. 8 is a configuration change map 800 for a UL HARQ and UL grant timing consideration in accordance with the present disclosure. The greyed cells (such as cell 802) indicate the reconfiguration pair allowed without breaking UL HARQ and retransmission timing. The cells with an X (such as cell 806) represent that the change is not allowed. For example, UL/DL configuration 0 is allowed to change to configuration 1; while UL/DL configuration 1 cannot change to configuration 0. Blank cells (such as cell 806) represent null entries showing no change in the configurations (i.e., configuration 0 to configuration 0, and so on). FIG. 9 is a schematic illustration showing an example of a UL HARQ and retransmission timing during UL/DL configuration 0 902 in radio frame 1 906 change to configuration 1 in radio frame 2 908 in accordance to the present disclosure. The lines 910a-f are the ACK/NACK linkage, and the line 912 is retransmission timing. Both UL HARQ and PUSCH retransmission timing linkage work during the transition period. Also the subframe #5 914 in configuration 0 902 frame can deliver an UL grant following the configuration 0 902 timing to schedule a PUSCH at subframe #2 916 after reconfiguration, shown as line 918.

The number of UL HARQ processes also changes as the TDD UL/DL configuration changes. For UL HARQ process, it is more difficult to handle the transition since it is a synchronous process and the UL grant does not contains the HARQ index number. However, the UL grant has one bit for new data indicator. Similar to DL case, when the number of HARQ processes changes to a larger or the same number after reconfiguration, the current n UL HARQ buffer(s) can directly transfer to the first n HARQ buffer(s) of the UL HARQ processes after reconfiguration. Both eNB and UE should know the mapping of HARQ number to subframe number.

The number of HARQ processes changes to a smaller number due to reconfiguration, for example, in FIG. 9, the number of UL HARQ processes is seven for configuration 0 and it is four for configuration 1. This issue can be addressed in several ways. For example, the UL HARQ buffer can be transferred to occupy all available UL HARQ processes and temporarily store the remaining UL HARQ buffers in the same order in a queue at both UE and eNB. The UL HARQ processes can be completed later when there is an opportunity. When a current HARQ completes, the eNB can send an UL grant with a negative new data indicator to UE. The UE can receive the grant with negative new data indicator, and knows to restart the very first stored HARQ process in the queue. The eNB may indicate a conservative MCS to UE to send PUSCH to make sure that eNB will receive it correctly and complete the HARQ transmission before the UL/DL configuration change in order to make the number of HARQ processes equal to the specified number after the change. The eNB may control the number of UL HARQ processes to the specified number after the change by purposely not granting new data initiating new UL HARQ process. The eNB can send an ACK regardless of the result of decoding right before the configuration change to terminate the excessive number of UL HARQ processes. The packet error can be passed onto the upper layer. Each above proposed schemes can be a standalone implementation, or two or more of the above proposed schemes may be used together.

Figures 10, 12:
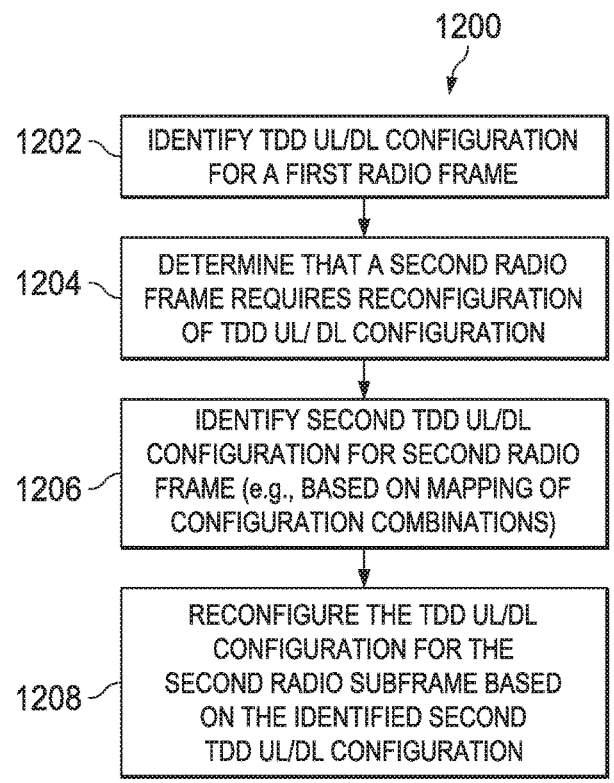
FIG. 10 is a configuration change map for consideration of both DL and UL timing in accordance with the present disclosure.
FIG. 12 is a process flowchart for reconfiguring TDD UL/DL configuration.

To put DL HARQ and UL HARQ and UL retransmission timing under consideration together, FIG. 10 presents allowable configuration combinations. FIG. 10 is a configuration change map 1000 for both DL and UL timing considerations in accordance with the present disclosure. The map 1000 shows TDD UL/DL configuration combinations for reconfiguring TDD UL/DL configuration. The greyed cells (such as cell 1002) indicate the allowable change combinations. Cells with an X (such as cell 1004) represent that the change is not allowed in terms of HARQ timing consideration. For example, UL/DL configuration 0 is allowed to change to configuration 1, 3, 4, and 6; while UL/DL configuration 1 cannot change to configuration 0, 2, 3, 5 and 6. Blank cells (such as cell 1006) represent null entries showing no change in the configurations (i.e., configuration 0 to configuration 0, and so on).

FIG. 11 is a schematic illustration 1100 showing an example of a UL and DL timing linkage transition during UL/DL configuration 4 1102 change to configuration 1 1104 in accordance to the present disclosure. The lines 1110 show the DL ACK/NACK linkage. The lines 1112 are the UL ACK/NACK linkage, and the lines 1114 are the UL retransmission timing.

FIG. 12 is a process flowchart 1200 for reconfiguring TDD UL/DL configuration. A first TDD UL/DL configuration for a first radio frame can be identified (1202). That is, a first radio frame is associated with a corresponding first TDD UL/DL configuration. This association may occur at any time prior to the existence of the first radio frame. It may be determined that the next radio frame will require a reconfiguring of the TDD UL/DL configuration (1204). A second TDD UL/DL configuration can be identified for the next (or second) radio frame, which is adjacent the first radio frame (1206). The second TDD UL/DL configuration can be identified based, at least in part, on one or more subframes of the second TDD UL/DL configuration that can communicate hybrid automatic repeat request (HARQ) acknowledgement/negative acknowledgement (ACK/NACK) indicators for corresponding subframes of the first TDD UL/DL configuration. The identification of the second TDD UL/DL configuration can be based on a mapping of available configuration combinations.

The second TDD UL/DL configuration may support a greater or equal number of HARQ processes than the first TDD UL/DL configuration. In certain implementations, the first TDD UL/DL configuration may support a greater number of HARQ processes than the second TDD UL/DL configuration. In the second instance, the first TDD UL/DL configuration may be associated with a first number of HARQ processes, and the first number of HARQ processes may be maintained, at least temporarily, for the second TDD UL/DL configuration. In certain aspects of the implementations, the second TDD UL/DL configuration may be associated with a second number of HARQ buffers, and a second number of HARQ processes associated with the first TDD UL/DL configuration may be executed. The second number of HARQ processes may be equal to the second number of HARQ buffers. In certain aspects of the implementations, a HARQ process for physical downlink/uplink shared channel can be completed prior to reconfiguration from the first TDD UL/DL configuration to the second TDD UL/DL configuration. In certain implementations, an ACK indicator can be communicated prior to the reconfiguring of the TDD UL/DL configuration.

In certain implementations, the HARQ processes are uplink (UL) HARQ processes. In that case, excess UL HARQ processes may be stored in a queue and upon receiving a negative new data indicator, executing a first UL HARQ process of the UL HARQ processes stored in the queue.

In certain aspects of the implementations, the second TDD UL/DL configuration includes a corresponding subframe for communicating the ACK/NACK indicator. In certain aspects of the implementations, identifying the second TDD UL/DL configuration includes identifying a subset of TDD UL/DL configurations available for communicating an ACK/NACK indicator for one or more subframes of the first TDD UL/DL configuration.

The restrictions on the reconfiguration combinations described above can be relaxed by using adaptive retransmission with UL grant for PUSCH where the retransmission timing linkage is broken during the TDD UL/DL configuration change. FIG. 13 is an example schematic illustration 1300 showing PUSCH adaptive retransmission during reconfiguration of UL/DL configuration 0 1302 to configuration 2 1304. According to the configuration 0 1302 timing, the ACK/NACK for PUSCH at subframe #2 1310 is received at subframe #6 1312 of the first radio frame 1306. If it is a NACK, the PUSCH retransmission takes place at subframe #3 1314 in the following radio frame (second radio frame 1308) (shown as dotted arrow 1316). Because of the change of TDD UL/DL configuration to configuration 2 1304, however, the subframe #3 1314 becomes DL subframe. Instead of transmitting NACK on PHICH at subframe #6 1312, the eNB can directly send a UL grant with negative NDI (New Data Indicator) in DCI0/DCI4 on PDCCH at subframe #6 1312 for PUSCH retransmission at subframe #2 1318 of the second radio frame 1304. The UL grant can be sent at the same subframe for sending the NACK and UL grant rule applies.

The new data transmission or re-transmission is indicated by the NDI in the DCI0/DCI4 UL grant. When a UE decodes the DCI0/DCI4, if the NDI is negative, the UE knows that the UL grant is for adaptive retransmission. The adaptive retransmission grant is sent at the same subframe where the ACK/NACK was originally sent, so the UE has the knowledge of which HARQ process it is related to. In this case, some of the restricted reconfiguration combinations described above are now possible.

FIG. 14 is a configuration change map 1400 for UL HARQ and grant timing consideration with adaptive PUSCH retransmission in accordance with the present disclosure. The greyed cells (such as cell 1402) indicate the reconfiguration pair allowed without breaking UL HARQ and retransmission timing. The cells with an X (such as cell 1404) represent that the change is not allowed. For example, UL/DL configuration 0 is allowed to change to configuration 1; while UL/DL configuration 1 cannot change to configuration 0. Blank cells (such as cell 1406) represent null entries showing no change in the configurations (i.e., configuration 0 to configuration 0, and so on).

FIG. 15 is a configuration change map 1500 for both DL and UL timing considerations with adaptive PUSCH retransmission in accordance with the present disclosure. The greyed cells (such as cell 1602) indicate the reconfiguration pair allowed without breaking UL HARQ and retransmission timing. The cells with an X (such as cell 1504) represent that the change is not allowed. For example, UL/DL configuration 0 is allowed to change to configuration 1; while UL/DL configuration 1 cannot change to configuration 0. Blank cells (such as cell 1506) represent null entries showing no change in the configurations (i.e., configuration 0 to configuration 0, and so on).

Figure 16:
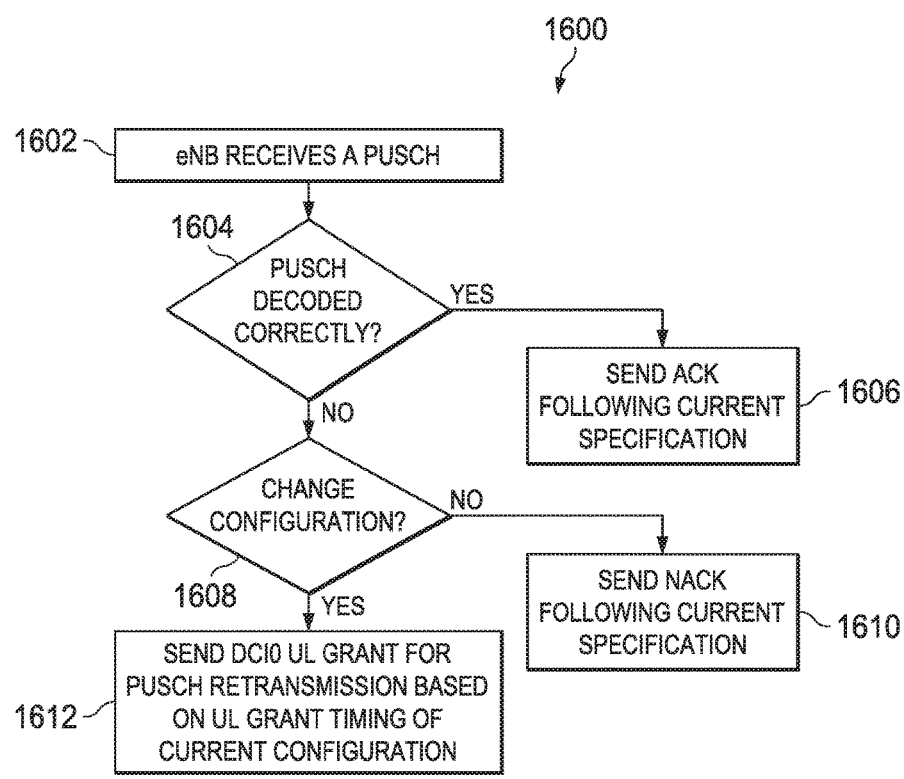
FIG. 16 is a process flowchart of adaptive PUSCH retransmission.

FIG. 16 is a process flowchart 1600 of adaptive PUSCH retransmission. An eNB may receive a physical uplink shared channel (PUSCH) (1602). It can be determined whether the PUSCH was decoded correctly (1604). If the PUSCH is decoded correctly, an ACK can be sent (1606). If the PUSCH was not decoded properly, it can be determined whether a change in configuration is required (1608). If no change is required, then a NACK can be sent (1610). If a change is required, then, the eNB can send a UL grant for PUSCH retransmission based on a UL grant timing of the configuration associated with the current radio frame. The second TDD UL/DL configuration may include a corresponding subframe for communicating the ACK/NACK indicator. In certain aspects of the implementations, identifying the second TDD UL/DL configuration may include identifying a subset of TDD UL/DL configurations available for communicating an ACK/NACK indicator for one or more subframes of the first TDD UL/DL configuration.

The issue of the number of HARQ processes can be addressed in the same way described above. As mentioned previously, adaptive transmission permits more configuration combinations. For example, PUSCH adaptive retransmission makes reconfiguration from UL/DL configuration 0 to configuration 2 and 5 possible. This availability of configuration combinations is applicable when UL/DL traffic ratio has a significant change from uplink intense (configuration 0) to downlink intense (configuration 2 and 5).

A number of embodiments of the invention have been described. Nevertheless, it will be understood that various modifications may be made without departing from the spirit and scope of the invention. Accordingly, other embodiments are within the scope of the following claims.

What is claimed is:

1. A method of reconfiguring a time division duplex (TDD) uplink/downlink (UL/DL) configuration, the method comprising:
   identifying, at a base station, a first TDD UL/DL predetermined configuration for a first radio frame;
   communicating data using the first TDD UL/DL predetermined configuration in the first radio frame;
   in response to a change in traffic ratio between UL and DL transmissions, identifying, at the base station, a second TDD UL/DL predetermined configuration for a second radio frame adjacent the first radio frame, the second TDD UL/DL predetermined configuration identified based, at least in part, on one or more subframes of the second TDD UL/DL predetermined configuration that can communicate at least one hybrid automatic repeat request (HARQ) acknowledgement/negative acknowledgement (ACK/NACK) indicator for a corresponding subframe of the first TDD UL/DL predetermined configuration, wherein the first TDD UL/DL predetermined configuration supports a greater number of HARQ processes than the second TDD UL/DL predetermined configuration, the HARQ processes are uplink (UL) HARQ processes
   communicating data using the second TDD UL/DL predetermined configuration in the second radio frame;
   storing excess UL HARQ processes in a queue; and
   upon receiving a negative new data indicator, executing a first UL HARQ process of the UL HARQ processes stored in the queue.

2. The method of claim 1, further comprising communicating an ACK indicator prior to the reconfiguring of the TDD UL/DL predetermined configuration.

3. The method of claim 1, further comprising reconfiguring the TDD UL/DL predetermined configuration for the second radio frame based on the identified second TDD UL/DL predetermined configuration.

4. The method of claim 1, wherein the first TDD UL/DL predetermined configuration and the second TDD UL/DL predetermined configuration are defined by an LTE standard.

5. A method of reconfiguring a time division duplex (TDD) uplink/downlink (UL/DL) configuration, the method comprising:
   identifying, at a base station, a first TDD UL/DL predetermined configuration for a first radio frame;
   communicating data using the first TDD UL/DL predetermined configuration in the first radio frame;
   in response to a change in traffic ratio between UL and DL transmissions, identifying, at the base station, a second TDD UL/DL predetermined configuration for a second radio frame adjacent the first radio frame, the second TDD UL/DL predetermined configuration identified based, at least in part, on one or more subframes of the second TDD UL/DL predetermined configuration that can communicate at least one hybrid automatic repeat request (HARQ) acknowledgement/negative acknowledgement (ACK/NACK) indicator for a corresponding subframe of the first TDD UL/DL predetermined configuration, wherein the first TDD UL/DL predetermined configuration supports a greater number of HARQ processes than the second TDD UL/DL predetermined configuration, and the second TDD UL/DL predetermined configuration is associated with a second number of HARQ buffers;
   communicating data using the second TDD UL/DL predetermined configuration in the second radio frame; and
   executing a second number of HARQ processes associated with the first TDD UL/DL predetermined configuration, the second number of HARQ processes equal to the second number of HARQ buffers.

6. A base station for reconfiguring a time division duplex (TDD) uplink/downlink (UL/DL) configuration, comprising:
   one or more processors configured to:
      identify, at the base station, a first TDD UL/DL predetermined configuration for a first radio frame;
      communicate data using the first TDD UL/DL predetermined configuration in the first radio frame;
      in response to a change in traffic ratio between UL and DL transmissions, identify, at the base station, a second TDD UL/DL predetermined configuration for a second radio frame adjacent the first radio frame, the second TDD UL/DL predetermined configuration identified based, at least in part, on one or more subframes of the second TDD UL/DL predetermined configuration that can communicate at least one hybrid automatic repeat request (HARQ) acknowledgement/negative acknowledgement (ACK/NACK) indicator for a corresponding subframe of the first TDD UL/DL predetermined configuration, wherein the first TDD UL/DL predetermined configuration supports a greater number of HARQ processes than the second TDD UL/DL predetermined configuration, the HARQ processes are uplink (UL) HARQ processes
      communicate data using the second TDD UL/DL predetermined configuration in the second radio frame;
      store excess UL HARQ processes in a queue; and
      upon receiving a negative new data indicator, execute a first UL HARQ process of the UL HARQ processes stored in the queue.

7. The base station of claim 6, wherein the first TDD UL/DL predetermined configuration and the second TDD UL/DL predetermined configuration are defined by an LTE standard.

8. A non-transitory computer-readable medium containing instructions which, when executed, cause a computing device to perform operations comprising:
   identifying, at a base station, a first time division duplex (TDD) uplink/downlink (UL/DL) predetermined configuration for a first radio frame;
   communicating data using the first TDD UL/DL predetermined configuration in the first radio frame;
   in response to a change in traffic ratio between UL and DL transmissions, identifying, at the base station, a second TDD UL/DL predetermined configuration for a second radio frame adjacent the first radio frame, the second TDD UL/DL predetermined configuration identified based, at least in part, on one or more subframes of the second TDD UL/DL predetermined configuration that can communicate at least one hybrid automatic repeat request (HARQ) acknowledgement/negative acknowledgement (ACK/NACK) indicator for a corresponding subframe of the first TDD UL/DL predetermined configuration, wherein the first TDD UL/DL predetermined configuration supports a greater number of HARQ processes than the second TDD UL/DL predetermined configuration, and the second TDD UL/DL predetermined configuration is associated with a second number of HARQ buffers;

communicating data using the second TDD UL/DL predetermined configuration in the second radio frame; and executing a second number of HARQ processes associated with the first TDD UL/DL predetermined configuration, the second number of HARQ processes equal to the second number of HARQ buffers.

* * * * *